April 21, 1970     M. W. GOODMAN ET AL     3,507,621

CARBON DIOXIDE ABSORBER FOR BREATHING DEVICES

Filed Aug. 20, 1965     2 Sheets-Sheet 1

INVENTORS
MAXWELL W. GOODMAN
THOMAS W. JAMES
CHARLES E. MICHIELSEN
BY
ATTYS.

April 21, 1970   M. W. GOODMAN ET AL   3,507,621
CARBON DIOXIDE ABSORBER FOR BREATHING DEVICES
Filed Aug. 20, 1965   2 Sheets-Sheet 2

INVENTORS
MAXWELL W. GOODMAN
THOMAS W. JAMES
CHARLES E. MICHIELSEN
BY
ATTYS.

United States Patent Office 3,507,621
Patented Apr. 21, 1970

3,507,621
**CARBON DIOXIDE ABSORBER FOR
BREATHING DEVICES**
Maxwell W. Goodman, 7929 Lansdale St., District
Heights, Md. 20028; Thomas W. James, 2519
Lyons St., Hillcrest Heights, Md. 20031; and
Charles E. Michielsen, 1120 Cervantes Way,
Pacifica, Calif. 94044
Filed Aug. 20, 1965, Ser. No. 481,437
Int. Cl. B01d 53/18
U.S. Cl. 23—252          1 Claim

ABSTRACT OF THE DISCLOSURE

A carbon dioxide absorbing canister for breathing devices having first and second perforate wall portions for containing gas absorbent chemical and for communicating, respectively, with the gas inlet and output. The wall portions are inclined with respect to each other in trapezoidal configuration thereby permitting progression of the zone of maximum gas flow along the trapezoidal walls as the absorbent chemical becomes deactivated and more resistant to gas flow.

---

The invention described herein may be manufactured and used by or for the Government of the United States of America for governmental purposes without the payment of any royalties thereon or therefor.

This invention relates to carbon dioxide ($CO_2$) absorbers for breathing devices, and more particularly to improvements in absorbent chemical containing canisters for closed or semi-closed cycle breathing apparatus.

Among the more important considerations in the construction of breathing and/or respiratory protective devices such as those used in underwater work, anesthesia, metabolism studies, mines, construction work, fire and resource, and the like, is the resistance to the breathing efforts of the person using the device. In the case of re-breathing or closed cycle devices in particular, wherein exhalations are passed through a chemical absorbent to remove $CO_2$ before being re-breathed, the resistance of the chemical absorbent to gas flow increases with the exposure of the chemical to moisture containing exhalations.

In general, it may be said that the resistance to flow of a gas through a granular particulate medium such as a chemical filter will be inversely proportional to the cross-sectional area of the flow path and directly proportional to the length. This would appear to dictate a cylindrical canister of substantial diameter and short length with the flow being transmitted axially thereof. While this provides initial favorably low breathing resistance, the short length aspect limits the length of time which the canister will be effective for removal of $CO_2$ to an acceptable level of $CO_2$.

In this regard, for purposes of removing $CO_2$ from breathable gas, the absorbent chemicals used do not have a definite "cut-off" point prior to which they absorb $CO_2$ and after which they do not. Rather, the reduction in absorbent power of any increment of the chemical in the canister is gradual but the canister as a whole is considered to have become exhausted when the $CO_2$ content of gas being passed rises to a nominal, arbitrary, figure such as 0.5 percent of the gas, which figure is taken as the maximum acceptable level of $CO_2$ in re-breathing apparatus used in swimming. Lengthening of the canister to increase operational life of the canister causes increases in resistance to flow to be concentrated in a zone about the gas inlet and tends to drive the breathing resistance above an acceptable level before the effective life of the chemical for removing $CO_2$ is exhausted. Concurrent increases in diameter to compensate for increased length results in an inordinately large and weighty canister, and one which is wasteful of chemical.

With the foregoing problems in mind, it is one important object of this invention to provide an improved carbon dioxide absorbing canister which is particularly efficient in that it provides reduction of carbon dioxide to requisite levels for long periods of time with a minimum mass of absorbent chemical.

Another important object of this invention is the provision of an improved $CO_2$ absorbing canister which exhibits a notably low resistance to gas flow throughout the useful life of the chemical charge.

As another object, this invention aims to achieve the foregoing by providing a canister for absorbing $CO_2$ wherein the gas flow path changes progressively during use.

Other objects and advantages of the invention will become apparent from the following detailed description of a preferred embodiment thereof, read in conjunction with the accompanying sheets of drawings forming a part of this specification, and in which.

Figure 1:
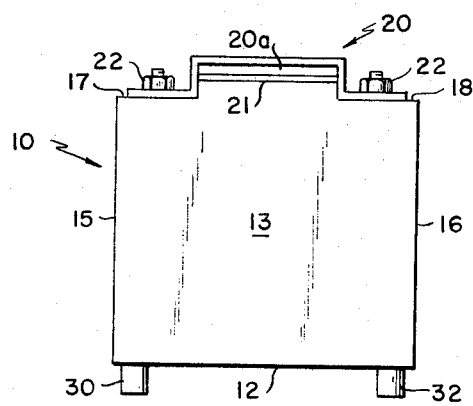
FIG. 1 is a front elevation of a carbon dioxide absorbing canister embodying the invention.

In the preferred form of the invention illustrated in FIGS. 1–3 and described hereinafter, there is provided an improved absorbent chemical canister 10 for use with breathing apparatus such as closed cycle self-contained underwater breathing apparatus. The general construction of such apparatus is well known to those skilled in the art to which the invention pertains and need not be described in detail herein. Suffice it to say that such apparatus (with the exception of pendulum breathing types later discussed) include means such as check valves for maintaining a uni-directional characteristic of gas flow through an absorbent chemical canister having inlet and outlet connections and containing a body of particulate chemical for absorbing carbon dioxide from exhaled gas prior to rebreathing thereof.

The canister 10 comprises a bottom wall 12, front and rear walls 13 and 14, side walls 15 and 16, and partial top walls 17 and 18. A removable cover 20 spans an opening between the partial top walls 17 and 18. The cover 20 comprises a closure member 20a adapted to fit snugly in the opening, and a bracket member 20b the opposite ends of which overlie the top wall portions 17, 18 and are secured thereto by removable fastening elements such as bolts 22. A suitable gasket 21 may be interposed between the cover 20 and the edges of the opening.

Although the various walls of the canister 10 have been designated as bottom, top, rear, front, and side walls, it will be understood that this is for convenience of description and that no particular orientation of the canister is required during use.

The interior of the canister 10 is divided by foraminous walls 24 and 25 into a central compartment 26 for receiving a carbon dioxide absorbing chemical (not shown), a first or inlet chamber 27 on one side of the central compartment, and a second or exhaust chamber 28 on the other side thereof.

The inlet chamber 27, which receives a user's carbon dioxide laden exhalations, is served by an inlet passage 30a defined at one end of that chamber by an inlet connection 30 secured in an opening in the bottom wall 12.

Similarly, the exhaust chamber 28, from which a user withdraws breathable gas from which carbon dioxide has been removed, is served by an outlet passage 32a defined at one end of that chamber by an outlet connection 32 secured in an opening in the bottom wall 12. The foraminous walls 24, 25 are conveniently formed of wire screening which, like the other walls of the canister, are formed of a material which is resistant to attack either by salt water or by the $CO_2$ absorbing chemical.

For purposes which will presently be made apparent, the foraminous walls 24, 25 are inclined with respect to one another so that the compartment 26 has a wider dimension A between the foraminous walls at one end thereof than the dimension A1 at the other end thereof. In addition, the inclination of the foraminous walls 24, 25 provides exhalation and inhalation chambers which are tapered in that the former increases in cross-sectional area going away from the inlet connection 30, while the latter chamber decreases in cross-sectional area going toward the outlet connection 32.

The canister 10 is prepared for use by removing the cover 20 and filling the compartment 26 with a suitable carbon dioxide absorbing chemical such as barium hydroxide lime compound, one example of which is known as "Baralyme." The absorbent chemical is preferably of granular or other particulate character, the particles being of a size which will be contained by the foraminous walls 24, 25.

After the cover 20 is replaced, the canister 10 is ready for operation in a rebreathing apparatus which directs the user's $CO_2$ laden gas exhalations through passage 30a into the chamber 27. From chamber 27, the gas flows through the foraminous wall 24, through the $CO_2$ absorbing chemical in compartment 26, and through wall 25 into chamber 28. Gas of lowered $CO_2$ content is withdrawn from chamber 28 through passage 32a for inhalation by the user.

Inasmuch as the ability of the chemical to absorb $CO_2$ from the exhalations diminishes with time of exposure, while resistance to gas flow increases with exposure, the invention provides for progressive alteration of the flow path through lesser used chemical so as to maintain relatively level degrees of absorption and resistance to flow throughout the effective life of the chemical charge in the canister.

The operation of the canister and the manner in which the present invention turns to advantage the characteristic of chemical $CO_2$ absorbents to increase their mechanical resistance to gas flow during a period of use in a breathing apparatus will now be explained with reference to FIGS. 4a–4d.

Because of the inclined relation of the foraminous walls 24, 25 and the resulting difference between the dimensions A and A1 of the chemical compartment 26, there is, at the time that use of a freshly charged canister begins, greater mechanical resistance to gas flow through the chemical at the wider end of the compartment 26 than at the narrow end thereof. Accordingly, when use is begun, $CO_2$ laden gas flows at a greater rate through the chemical at the end having the narrower dimension A1. The gradation in flow rates between the wider and narrower ends of the canister at a time T1 near the beginning of a period of use is indicated by arrows 40 in FIG. 4a with the lengths of the arrows decreasing with decreases in flow rate toward the end of the compartment 26 having the wider dimension A.

Figure 4A:
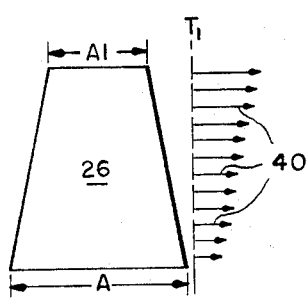
FIGS. 4a–4d are diagrammatic views illustrating flow characteristics of the canister during use.
Figure 4B:
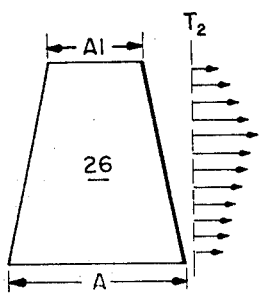
Figure 4C:
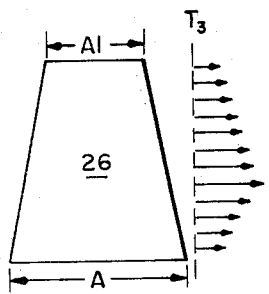
Figure 4D:
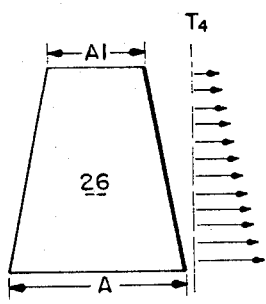

The absorbent chemical at the narrower end of the compartment 26, because of its early, more intense subjection to gas flow becomes more resistant to flow than the remainder of the chemical. As time progresses to a time T2, the flow of gas is progressively altered to the condition illustrated in FIG. 4b wherein the maximum flow rate may be found to have moved toward the wider end of the compartment 26. The maximum flow at T2 thereby passes through chemical which has been less intensively subjected to gas flow. FIGS. 4c and 4d show the further progression of the maximum flow rate toward the larger end of the compartment 26 as the period of use continues through times T3 and T4 toward completion.

The canister 10 may be made in various sizes and volumes depending upon the length of time the canister is to be relied upon for removal of $CO_2$ to the desired nominal level. The degree of inclination of the foraminous walls 24, 25 will depend somewhat on the size of the canister and the rates at which the chemical to be used decreases in absorbency and increases in flow resistance. The greater the degree of inclination, the more rapid will be the progression of the maximum flow zone toward the wider end of the compartment 26. The optimum inclination for a given canister size will effect progression of the maximum flow zone toward the wider end at a rate which will gain the most use of the chemical absorbent qualities without developing excessive resistance to gas flow through the canister as a whole near the end of the useful life period of the canister with respect to approach of the nominal figure of maximum $CO_2$ permissible in the gas withdrawn from the exhaust chamber.

Figure 2:
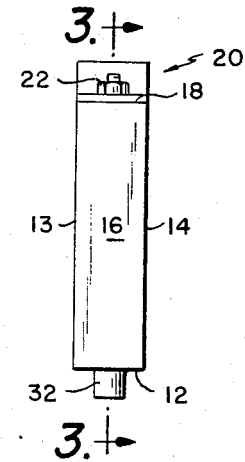
FIG. 2 is a side elevation of the canister of FIG. 1.
Figure 3:
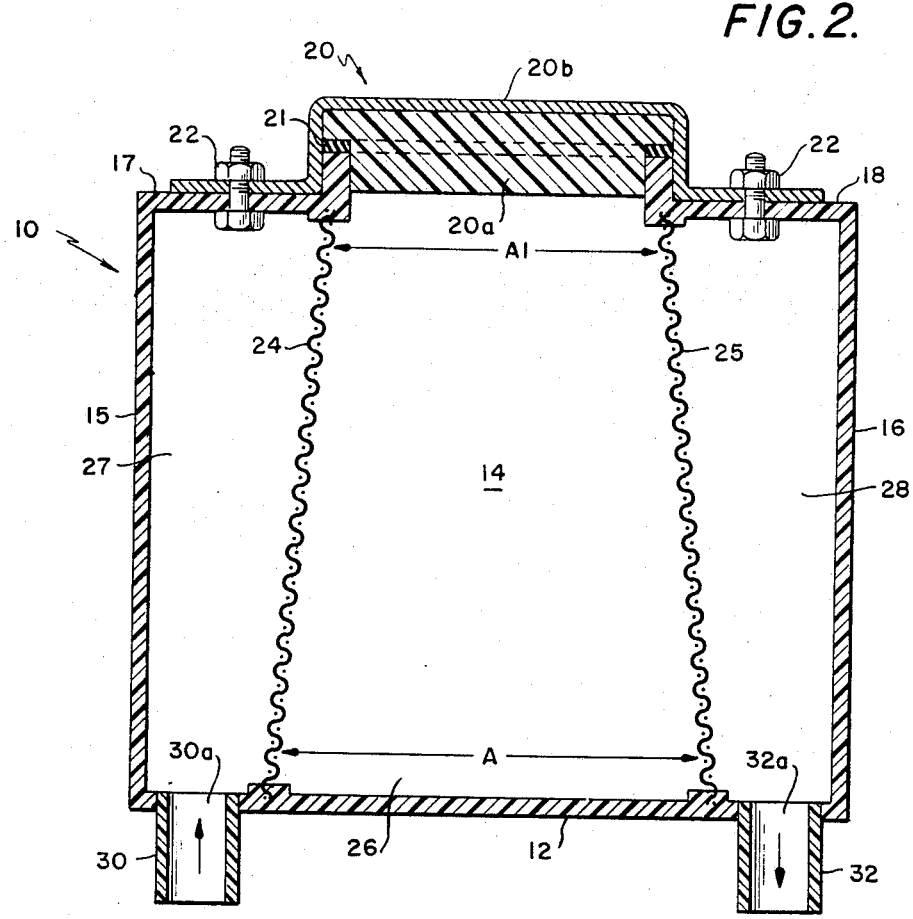
FIG. 3 is an enlarged vertical sectional view of the canister taken substantially along line 3—3 of FIG. 2.

Reverting to FIG. 2, it will be recalled that the inlet and exhaust chambers 27, 28 are tapered throughout their lengths, increasing in cross-sectional area going in a direction away from the respective passages 30a, 32a. This construction obviates abrupt changes in flow direction which would produce turbulence and effect a notable increase in breathing resistance. Moreover, because of the symmetry of the tapered chambers, losses and gains in potential and kinetic energy of the gas due to expansion and compression occurring upon entry into and exit from the passages 30a, 32a will be self-cancelling and will not be reflected in measurable added effort to the user of the apparatus.

Figure 5:
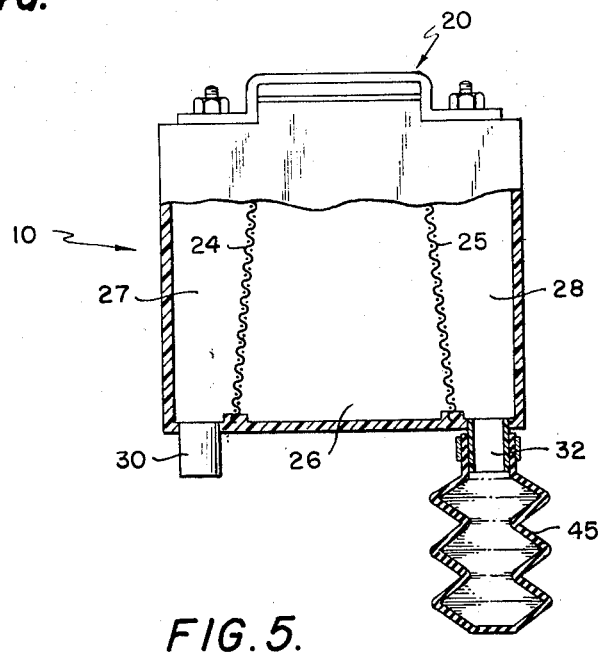
FIG. 5 is a sectional view illustrating the canister in use in a pendulum breathing system.

Referring to FIG. 5, there is illustrated an example of use of the canister 10 in a so called pendulum type system mentioned earlier. In this type of use, there is provided expansible chamber defining means such as a bellows 45 which is shown connected to the outlet connection 32. The bellows 45 defines a space which forms an expansible continuation of the chamber 28 and may be considered as part thereof.

In pendulum use, the user's exhalations are passed through the connection 30 into chamber 27, thence through the foraminous wall 24, absorbent chemical containing compartment 26, foraminous wall 25 into the chamber 28 which is now expansible in character due to the presence of bellows 45 which expands to accommodate a volume of gas from which $CO_2$ has largely been removed due to passage through the chemical containing compartment 26.

Inhalation on the part of the user withdraws gas from the chamber 27 whereupon a corresponding volume of gas flows from expansible chamber 28 on a return passage through compartment 26 and its contained chemical. It will be observed that it is desirable with this type of operation of the canister 10 to provide chamber 27 with a minimal volume to reduce the amount of exhaled gas which is returned to the lungs without benefit of having been passed through the $CO_2$ absorbing chemical in compartment 26.

None-the-less, it will further be observed that the inclined walls of the compartment 26 will provide the progressive change of flow path through the chemical therein which is characteristic of the present invention and which provides the previously described benefits of prolonged effective use of the chemical and notably low resistance to gas flow throughout the effective life thereof.

From the foregoing detailed description, it will be appreciated that the present invention has provided a novel and improved $CO_2$ absorber which, by reason of progressive change of the gas flow path, effects reduction of $CO_2$ to requisite levels for a long period of time with a minimum of absorbent chemical and exhibits a notably low resistance to gas flow throughout the useful life of the chemical.

Although the invention has been described in considerable detail with reference to exemplary embodiments thereof, it will be understood that the invention is not limited thereto, but rather the invention includes all those modifications, substitutions, adaptations which will occur to those skilled in the art.

What is claimed is:

1. A carbon dioxide absorber for use with breathing apparatus comprising:

means defining a first chamber having an inlet for receiving $CO_2$-laden gas, said first chamber being defined in part by a first foraminous wall, the transverse cross sectional area of said first chamber increasing in a direction going away from said inlet;

means defining a second chamber having an outlet, said second chamber being defined in part by a second foraminous wall, the transverse cross sectional area of said second chamber increasing in a direction going away from its outlet;

an absorbent chemical compartment disposed between said first and second chambers and defined in part by said first and second foraminous walls;

said absorbent chemical compartment being adapted for containing $CO_2$ absorbent chemical of a type which offers increased resistance to gas flow with increased exposure to breathing exhalations; and said first and second foraminous walls being inclined with respect to one another so as to define an acute angle therebetween.

References Cited

UNITED STATES PATENTS

| 2,112,335 | 3/1938 | Drennan | 55—518 |
| 2,269,500 | 1/1942 | Wildhack | 128—191 |
| 2,469,367 | 5/1949 | Burgess et al. | 23—281 |

JAMES H. TAYMAN, Jr., Primary Examiner

U.S. Cl. X.R.

23—4, 284; 55—387, 389, 512, 518; 128—191